J. N. RANDLE.
CUSHIONING DEVICE.
APPLICATION FILED JAN. 24, 1912. RENEWED JAN. 22, 1913.
1,056,580.
Patented Mar. 18, 1913.
2 SHEETS—SHEET 1.
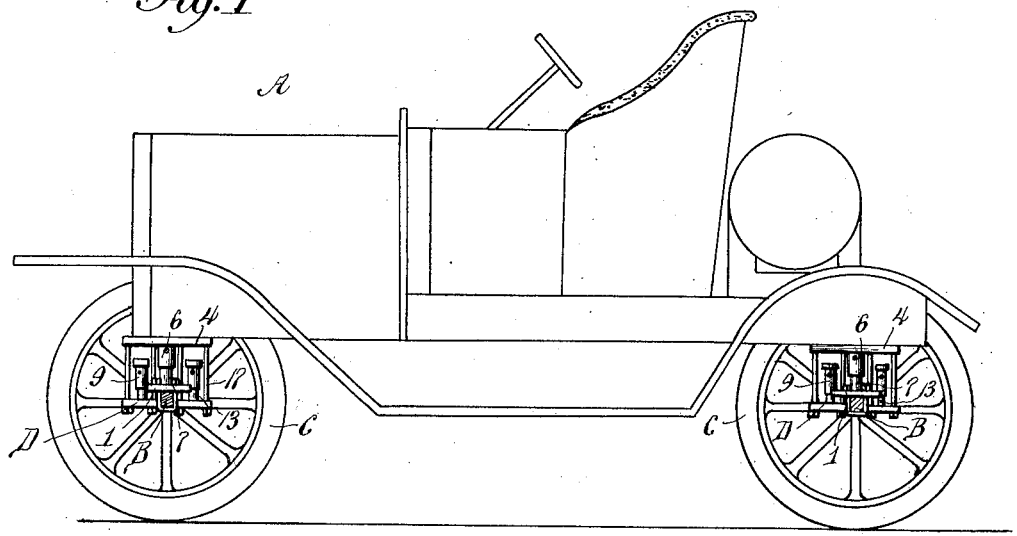
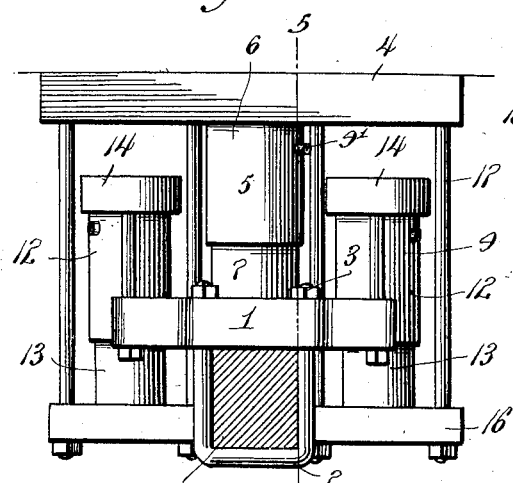
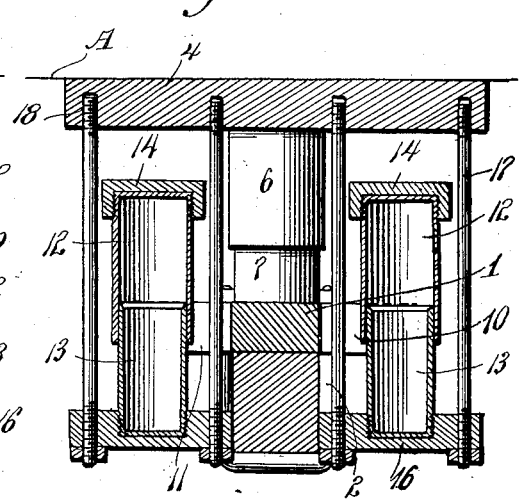
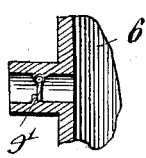
Witnesses
W. S. McDowell
John J. McCarthy
Inventor
James N. Randle
By Victor J. Evans
Attorney J. N. RANDLE.
CUSHIONING DEVICE.
APPLICATION FILED JAN. 24, 1912. RENEWED JAN. 22, 1913.

1,056,580.

Patented Mar. 18, 1913.

2 SHEETS—SHEET 2.

Inventor
James N. Randle

Witnesses
W. S. McDowell
John J. McCarthy

By Victor J. Evans
Attorney

UNITED STATES PATENT OFFICE.

JAMES N. RANDLE, OF EUGENE, OREGON.

CUSHIONING DEVICE.

1,056,580.   Specification of Letters Patent.   Patented Mar. 18, 1913.

Application filed January 24, 1912, Serial No. 673,075. Renewed January 22, 1913. Serial No. 743,654.

*To all whom it may concern:*

Be it known that I, JAMES N. RANDLE, a citizen of the United States of America, residing at Eugene, in the county of Lane and State of Oregon, have invented new and useful Improvements in Cushioning Devices, of which the following is a specification.

The invention relates to improvements in cushioning devices and has particular application to devices of this character which are adapted to be utilized in vehicle construction to eliminate shocks or vibration to the body of the vehicle upon the vehicle meeting obstructions in the road way during its course of travel.

In carrying out the present invention, it is my purpose to provide a cushioning device which will be applicable to vehicles and which may be used instead of metallic springs and other forms of shock absorbing devices, the device embodied in the present invention being disposed intermediate the vehicle axle and the body thereof and serving to permit relative movement of the body and axle to prevent the transmission of shocks or vibration from the running gear to the vehicle body. Furthermore, I aim to provide a cushioning device which will include a plurality of yieldable members designed to operate in relatively opposite directions to eliminate the transmission of vibrations from one point to another.

A further object of the present invention is the provision of a device of this type which will include a plurality of containers adapted to contain a compressible fluid, such as air, and designed to operate in relatively opposite directions subsequent to one another to prevent jarring and to take up the rebound.

With the above and other objects in view which shall appear as the description progresses, the invention consists in the construction, combination and arrangement of parts hereinafter set forth in and falling within the scope of the appended claim.

Figure 2:
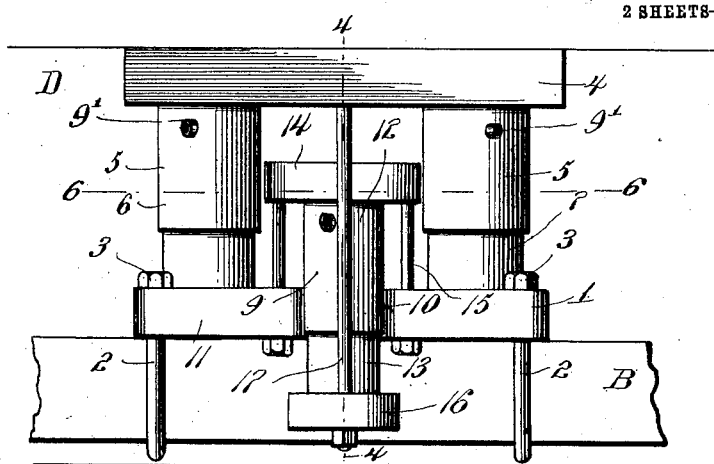
Figure 5:
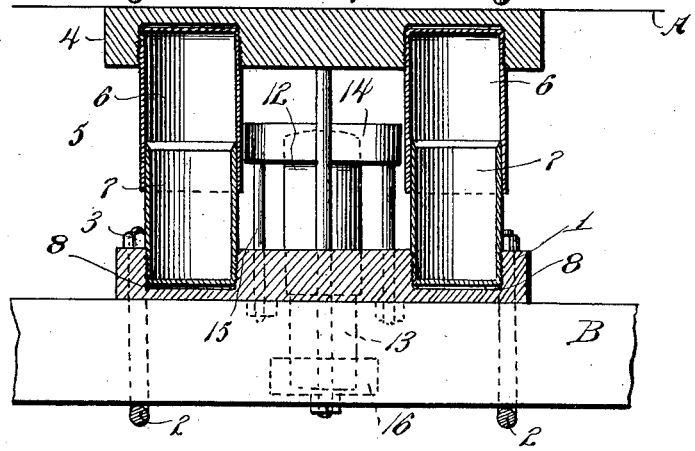
Figure 6:
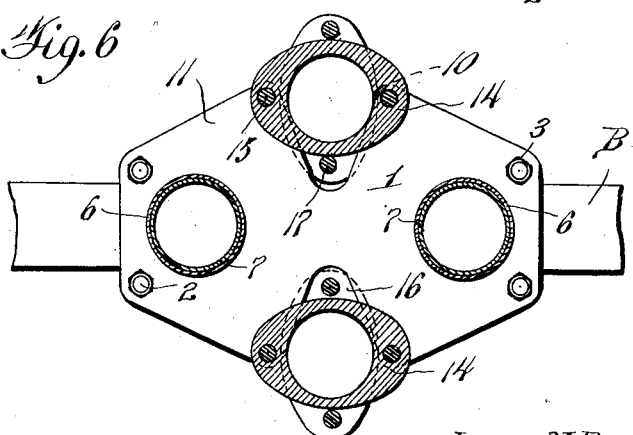

In the accompanying drawings forming a part of this specification and in which I have illustrated what I consider to be the preferred embodiment of the invention; Figure 1 is a side elevation of a vehicle partly broken away and equipped with the present invention. Fig. 2 is a front elevation of a cushioning device constructed in accordance with the present invention detached from a vehicle. Fig. 3 is a side elevation of the same. Fig. 4 is a section on the line 4—4 of Fig. 2. Fig. 5 is a section on the line 5—5 of Fig. 3, and Fig. 6 is a longitudinal sectional view on the line 6—6 of Fig. 2.

Referring to the accompanying drawings in detail, A designates the body of a vehicle, B the axle and C the road wheels. The vehicle may be of any usual construction and either self-propelled or horse-drawn as the case may be.

My improved cushioning device is designated in general at D and, as illustrated, is positioned upon the axle B intermediate the same and the bottom of the body A to relieve the body of shocks or vibrations upon the road wheels meeting obstructions in the course of travel of the vehicle. In the present instance, the cushioning device includes a base plate 1 adapted to be secured to the upper surface of the vehicle axle through the medium of U-shaped clips 2 designed to embrace the vehicle axle and having their free ends projecting through the plate 1 and screwthreaded to receive retaining nuts 3.

Arranged above the base plate and rigidly secured to the bottom of the vehicle body is what I term a bed piece 4 adapted to remain stationary relatively to the base 1 to permit movement of the axle with respect to the body of the vehicle in the event of the road wheels of the vehicle meeting an obstruction. To facilitate this movement of the axle relatively to the body and to prevent transmission of shocks from the axle to the body, a plurality of yieldable members 5, 5, shown in the present instance to be two, are arranged intermediate the base plate 1 and the bed piece 4. Each of these members 5, 5, consists of a sectional telescopic container having one section 6 threadedly engaging an opening formed in the under surface of the bed piece 4 and a section 7 telescoping into the section 6 and having its base threadedly engaged in an opening 8 formed in the base plate 1. The containers are provided with valves 9′ arranged within a suitable nipple and designed to permit air, under pressure, to be introduced into the containers to cushion the yielding movement of the same in the upward movement of the axle with respect to the vehicle body. Thus, it will be seen that air at any suitable pressure may be introduced into the containers and held therein by means of the valves 9″ to permit the section 7 to telescope within the section 6 in the upward movement of the axle whereby the transmission of shocks and vibrations to the vehicle body is obviated. The cushioning devices 5, 5 are preferably arranged longitudinally of the axle and consequently transversely of the vehicle body so that instantaneous operation of the cushioning device may be obtained in the movement of the axle.

To cushion the rebound, incident to the vehicle axle assuming its normal position, and to eliminate vibration of the vehicle body upon the axle assuming said position, a plurality of yieldable members 9, 9, preferably a number corresponding to the number of members 5, 5, are arranged transversely of the yieldable members 5, 5 and of the vehicle axle, and consequently longitudinally of the body A of the vehicle. The members 9, 9, in the present instance, are arranged in semicircular cut-out portions 10, 10 of laterally projecting wings 11, 11 of the base plate 1 and project above and below the latter. Each of the members 9, 9 comprises a telescopic container composed of relatively movable sections 12 and 13 and provided with suitable nipples and valves to facilitate the charging of the containers with air, or other suitable compressible fluid, so as to cushion the relative movement of the sections in the rebound of the vehicle. The section 12 of each yieldable member 9 has its upper end threaded into a head 14, preferably, of circular contour and provided at diametrically opposite points with apertures designed to receive the headed extremities of bolts 15, the latter having their lower ends passed through openings in the plate 1 upon opposite sides of the cut-out portion 10 and in alinement with the openings in the head 14. The lower section 13 of each yieldable member 9 has its lower end threaded into a base 16 mounted upon one side of the axle B and provided at diametrically opposite points with openings adapted to receive spaced parallel rods 17 having their upper or free ends threadedly engaged in recesses 18 formed in the under surface of the bed piece 4. By virtue of this construction the sections of the containers of the yieldable members 9 are distended in the upward movement of the vehicle axle thereby permitting the members 5 to take up the relative movement of the axle. Upon the rebound the members 5 are distended and the sections of the members 9 telescoped to compress the fluid therein whereby transmission of shock or vibration, incident to the rebound of the vehicle axle, to the vehicle body is prevented.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described my invention, what I claim and desire to secure by Letters-Patent is:

The combination with a vehicle, of a cushioning device including a base plate adapted to be secured to the vehicle axle and provided with wings having oppositely arranged cut-out portions upon the opposite sides of the vehicle axle, a bed piece adapted to be secured to the vehicle body, a plurality of yieldable members intermediate said bed piece and base plate and arranged longitudinally of the axle and adapted to operate to eliminate transmission of shock or vibration from the vehicle axle to the body in the upward movement of the axle, and a plurality of yieldable members arranged upon the opposite side of the axle and mounted within said cut-out portions of the wings of the base plate and adapted to operate to cushion the rebound of the vehicle axle subsequent to the operation of the first-named members.

In testimony whereof I affix my signature in presence of two witnesses.

JAMES N. RANDLE.

Witnesses:
 FRED. L. DORMAN,
 M. SVARVERUD.

---

Copies of this patent may be obtained for five cents each, by addressing the "Commissioner of Patents, Washington, D. C."